Oct. 13, 1931.   G. E. CHATILLON   1,826,732
STABILITY TESTING APPARATUS
Filed June 26, 1928   2 Sheets-Sheet 2

INVENTOR
George E. Chatillon
BY
ATTORNEY

Patented Oct. 13, 1931

1,826,732

UNITED STATES PATENT OFFICE

GEORGE E. CHATILLON, OF NEW YORK, N. Y., ASSIGNOR TO JOHN CHATILLON & SONS, OF NEW YORK, N. Y., A CORPORATION OF NEW YORK

STABILITY TESTING APPARATUS

Application filed June 26, 1928. Serial No. 288,352.

This invention relates to improvements in apparatus for testing the stability of plastic and semi-plastic materials and has for its object to provide a simple and efficient apparatus for testing specimens uniformly and at a constant rate of speed.

The invention is particularly adapted for testing the stability, or resistance to displacement, of compressed asphalt paving mixtures. In such case the test is preferably made upon a test specimen maintained at a constant temperature and supported in a mold equipped with a snugly fitting plunger. Stability is measured, preferably in pounds, by the maximum load required to force the mixture through a small orifice in the bottom of the mold.

According to a feature of the invention, the load is applied to the test specimen, while mounted on a scale, by rotating a hand wheel at a contant rate of speed to cause the plunger to descend and compress the specimen uniformly. When the limit of stability is reached the material commences to exude through the orifice in the bottom of the mold. The dial of the scale is provided with a push pointer which registers the maximum load attained during test, and this value is recorded as the stability, or resistance to displacement, of the test specimen.

Figure 1:
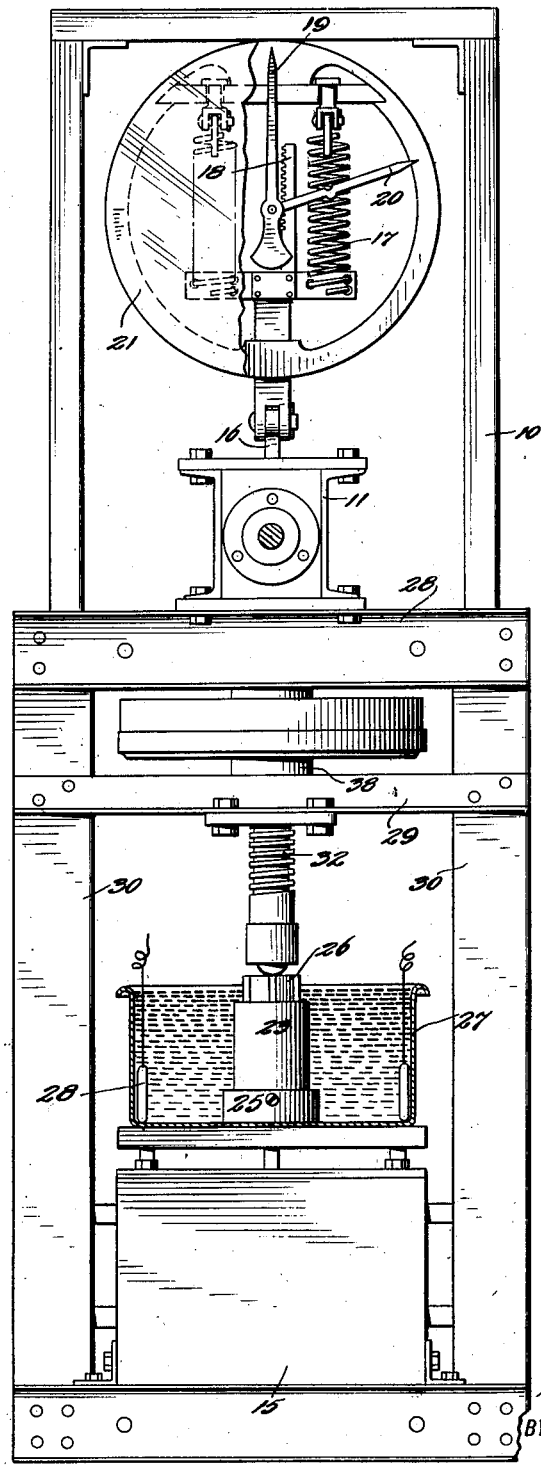
Figure 2:
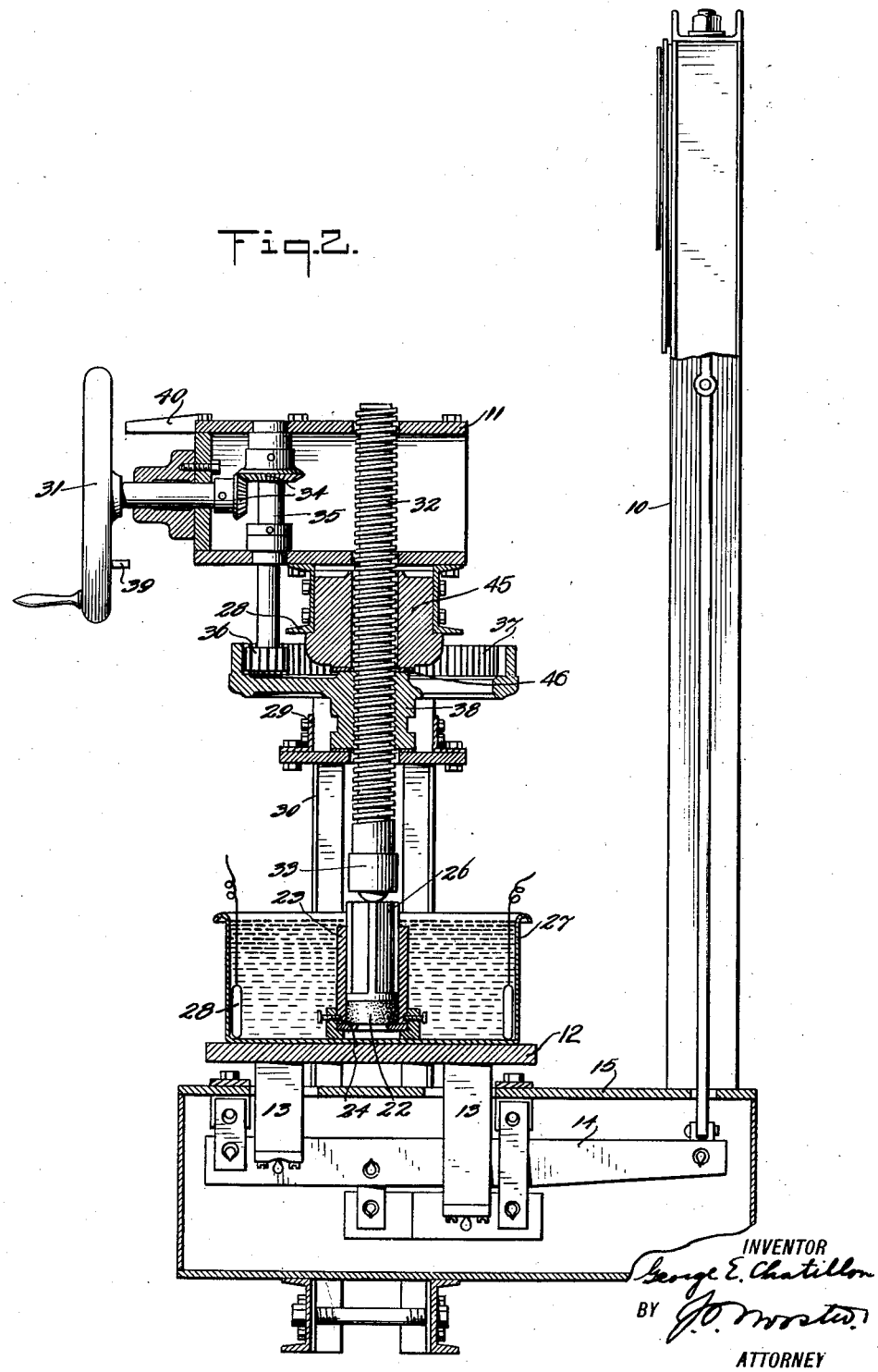

The invention will be described in connection with the accompanying drawings in which, Fig. 1 is a front elevation showing the preferred construction of the testing apparatus; and Fig. 2 is a side view, partly in section, thereof.

The testing apparatus includes a scale 10 of any suitable construction, and an actuating device 11 for applying the load to the specimen under test, as hereinafter described.

The scale 10 includes a platform 12; pitmen 13 communicating with a scale beam 14 inside the casing 15; connecting rod 16; coil springs 17; a rack 18 cooperating with a pinion on an indicator 19; a push pointer 20: and a graduated dial 21.

The material to be tested is preferably in the form of a cylindrical briquette, illustrated at 22. In testing semi-plastic asphalt paving mixtures a cylindrical test specimen two inches in diameter and one inch high has been employed. The test specimen is preferably mixed and compressed at the same temperature used in laying the pavement. The briquette is placed in a cylindrical mold 23 having an annular testing ring 24 supported at the lower end thereof by means of a clamping collar 25. A plunger 26 fits snugly into the mold 23 as shown.

Paving materials are preferably tested at a temperature approximating the pavement temperature in hot weather, since they are subject to maximum displacement under such conditions. The briquette 22 is therefore preferably tested in a tank 27 of hot water containing electric heating elements 28 adapted to maintain the water at the desired temperature. The tank 27, with the elements arranged as shown, is mounted on the scale platform 12.

The actuating mechanism 11 is mounted on cross bars 28 and 29 supported between end frames 30, and includes a hand wheel 31 adapted to be rotated to actuate a vertical shaft 32 provided with a testing head 33. The rotary movement of the hand wheel 31 in a clockwise direction is communicated by means of gears 34 to shaft 35 and thence by means of pinion 36 and internal gear 37 to a threaded bushing 38 cooperating with the threaded shaft 32, causing the shaft 32 and the testing head 33 to descend.

A bushing 45 mounted between cross bars 28 serves to guide shaft 32. This bushing 45 is not threaded and is fixed with respect to bars 28. A washer 46 is disposed on shaft 32 between bushing 45 and threaded bushing 38.

In operating the testing apparatus the briquette to be tested is placed in the testing mold 23 and forced to the bottom of the mold by the plunger. The whole assembly is then placed in the center of the bath, mounted on the platform 12, and brought under the testing head 33 in such a manner that the ball end of the testing head engages the center of the plunger. The hand wheel 31 is then rotated, for example, at a speed of one revolution per second, causing the testing head 33 to force the plunger 26 against the briquette 22 at a uniform rate approximating one inch in twenty-five seconds. The revolutions of the hand wheel 31 may be timed with a metronome set to beat at half-second intervals, a lug 39 on the hand wheel engaging a flexible pin 40 to click at each revolution. The load thus applied to the briquette 22 registers on the dial 21. The push pointer 20 registers the maximum load attained during the test, which is reached when the material commences to exude through the orifice in the testing ring 24. This value represents the stability value, or resistance to displacement, of the material under test.

The apparatus is simple in construction, with all parts readily accessible for operation or adjustment. The test is accurate since the load is applied uniformly at a constant rate of speed.

It is evident that the invention is capable of various modifications and adaptations within the scope of the appended claims.

I claim:

1. Apparatus for testing the stability of plastic and semi-plastic materials and mixtures comprising a scale, a mold having an orifice in the lower portion thereof adapted to receive a test specimen mounted on said scale, a plunger acting in said mold, means for actuating said plunger to load the test specimen, an indicator on said scale, and a push pointer actuated by said indicator to indicate the maximum resistance developed in forcing a portion of said specimen through the orifice in said mold.

2. Apparatus for testing the stability of plastic and semi-plastic materials and mixtures comprising a scale having a horizontal platform, a mold having an orifice in the bottom thereof adapted to receive a test specimen mounted on said platform, a vertical plunger acting in said mold, a vertical shaft adapted to contact with said plunger, means for lowering said shaft at a constant rate of speed to cause said plunger to load said specimen uniformly, an indicator on said scale to indicate the force applied to said specimen, and a push pointer actuated by said indicator to indicate the maximum compression required to force a portion of said specimen through the orifice in said mold.

3. Apparatus for testing the stability of plastic and semi-plastic materials and mixtures comprising a scale, a mold adapted to receive a test specimen mounted on said scale, said mold having an opening therein, a plunger acting in said mold, means for actuating said plunger to load the test specimen and means for indicating the maximum resistance developed in forcing a portion of said specimen through the opening in the mold.

Signed at New York city, in the county of New York and State of New York this 21st day of June, A. D. 1928.

GEORGE E. CHATILLON.